United States Patent [19]

Okada et al.

[11] 4,285,472
[45] Aug. 25, 1981

[54] WATER DROPPING TYPE IRRIGATION PIPE

[75] Inventors: Hiroaki Okada; Takefumi Sonoda; Osamu Shoji, all of Ayasemachi, Japan

[73] Assignee: Toyo Soda Manufacturing Co., Ltd., Shin nanyo, Japan

[21] Appl. No.: 28,650

[22] Filed: Apr. 10, 1979

[30] Foreign Application Priority Data

Apr. 12, 1978 [JP] Japan ................................. 53/42834

[51] Int. Cl.³ ............................................. B05B 15/00
[52] U.S. Cl. ................................................. 239/542
[58] Field of Search ............... 239/542, 145, 547, 582; 138/111, 40, 42; 156/290, 291, 217, 203

[56] References Cited

U.S. PATENT DOCUMENTS

| 3,467,142 | 9/1969 | Boyle et al. ..................... 138/111 |
| 4,047,995 | 9/1977 | Leal-Diaz ....................... 239/542 X |
| 4,195,784 | 4/1980 | Gilead ............................. 239/542 |

FOREIGN PATENT DOCUMENTS

| 2726358 | 12/1977 | Fed. Rep. of Germany ........... 239/542 |
| 2815628 | 10/1978 | Fed. Rep. of Germany ........... 239/542 |

Primary Examiner—Robert B. Reeves
Assistant Examiner—Gene A. Church
Attorney, Agent, or Firm—Oblon, Fisher, Spivak, McClelland & Maier

[57] ABSTRACT

A water dropping type irrigation pipe includes a conduit formed by peeling laminated films in a longitudinal direction; laminated side parts projected to both sides of the conduit in a form of fins and a water distribution passage formed by peeling at least one of the laminated side parts in a distribution passage pattern having a throat part which is branched from the conduit.

7 Claims, 26 Drawing Figures

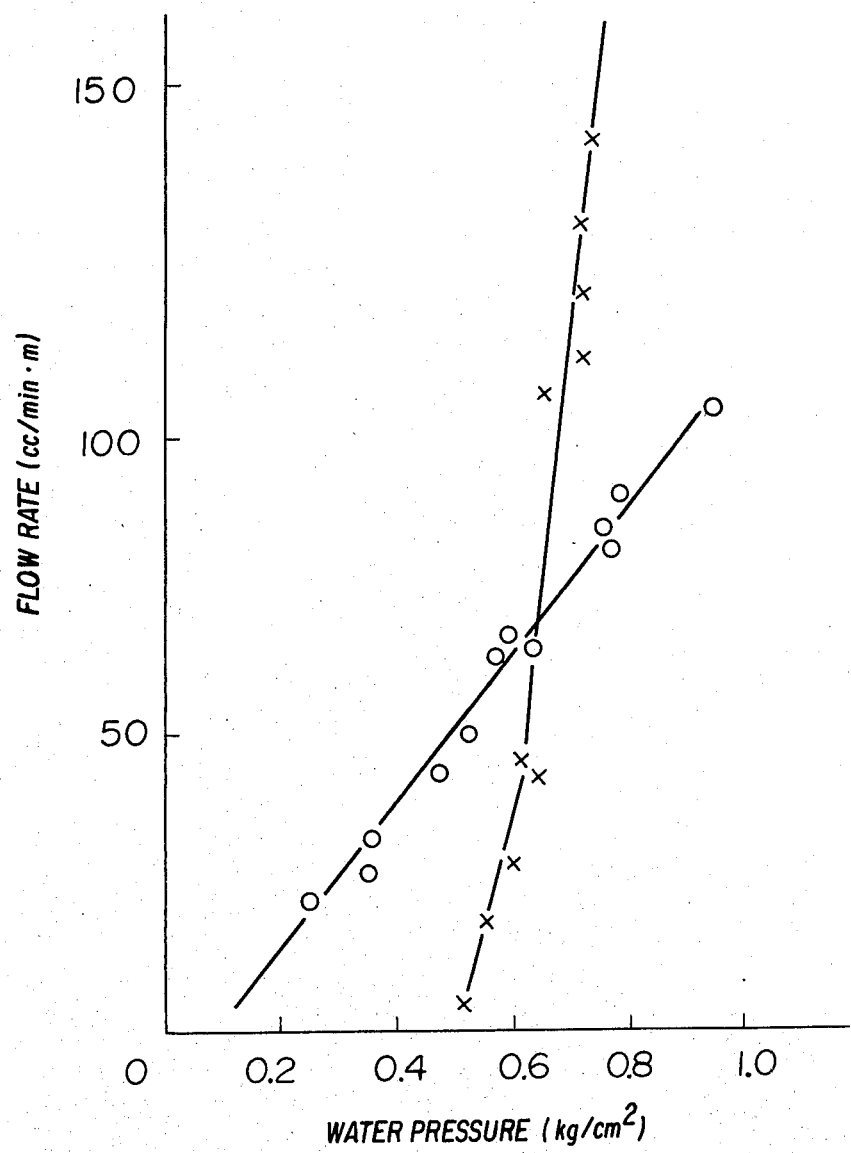
F I G. 16

WATER DROPPING TYPE IRRIGATION PIPE

BACKGROUND OF THE INVENTION

1. Field of the Invention:

The present invention relates to a water dropping type irrigation pipe which is effective for irrigation and manuring (fertilizer application) in an agricultural and horticultural facility and which is compact, easily handling and economical.

2. Description of the Prior Art:

A water dropping irrigation is a system for supplying directly around roots of plants at low flow rate for a long time by reducing pressure of pressurized water through irrigation equipment laid on or under the soil surface. This is a novel irrigation system suitable for dried land and sandy land which has advantages of (1) water-saving; (2) yield increase; (3) salt injury inhibition; and (4) growth term shortening in comparison with the conventional furrow irrigation and a water spraying method.

The following water dropping type irrigation equipments have been known; (1) an irrigation nozzle having inner small diameter screw passage; and (2) a double wall pipe having many fine holes on inner and outer walls.

In these conventional irrigation equipments, it has been considered to reduce a flow rate and to prevent a serious reduction of flow rate at an end so as to irrigate uniformly even though a long pipe is used. However, the shape is complicated in being small whereby a complicated manufacturing manner is needed to cause low productivity and high cost, disadvantageously.

In manufacture of the irrigation nozzle, a precise injection molding is required. In manufacture of the double wall pipe, a combination of a profile extrusion molding or a heat melt bonding of ends of film and perforation are needed. In both cases, productivity could not be high enough and many products could not be prepared in parallel in one line in technical aspects. It has been difficult to reduce processing cost and to increase productivity in mass production by using a large molding machine. Beside such productivity, it has not been easy to lay down and take off equipment on a culture land. The equipment could not be wound compactly and it could not be easily moved or stored to cause trouble in a practical usage. Improved equipment has thus been required.

SUMMARY OF THE INVENTION

It is an object of the present invention to provide a water dropping type irrigation pipe in one piece of a conduit and branched water distribution passages which is compact, easily handling and economical and imparts uniform irrigation and which can be manufactured with higher productivity at parallel lines in higher speed in comparison with those of the conventional equipments.

BRIEF DESCRIPTION OF THE DRAWINGS

FIG. 16 is a graph showing a relation of water pressures and flow rates;

DETAILED DESCRIPTION OF THE PREFERRED EMBODIMENTS

Figure 1:
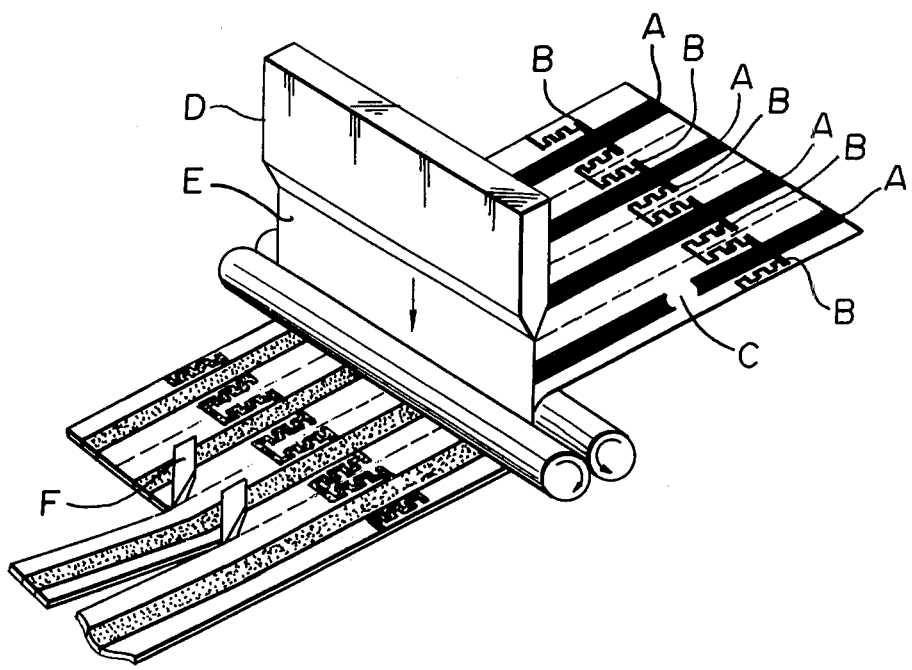
FIG. 1 shows a process for preparing irrigation pipes according to the present invention.
Figure 2:
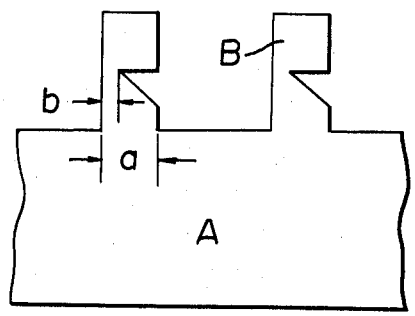
FIGS. 2 to 12 are plane views of embodiments of distribution passage patterns having a throat part.
Figure 3:
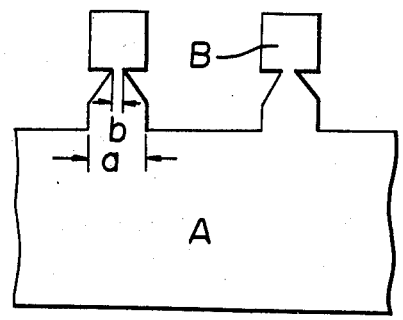
Figure 4:
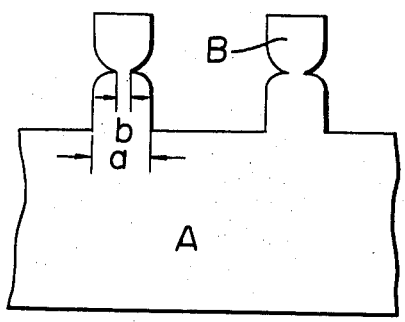
Figure 5:
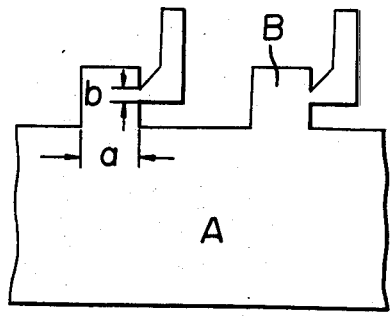
Figure 6:
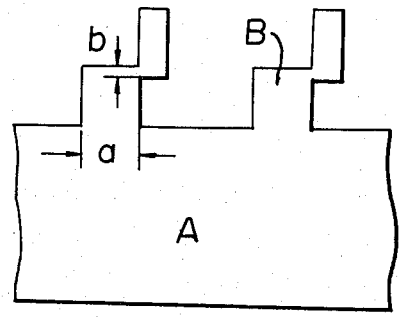
Figure 7:
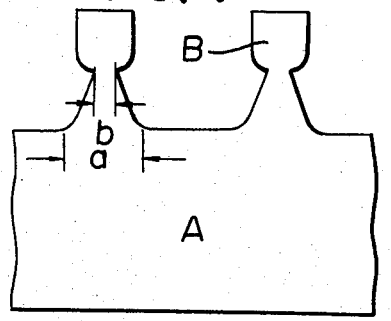
Figure 8:
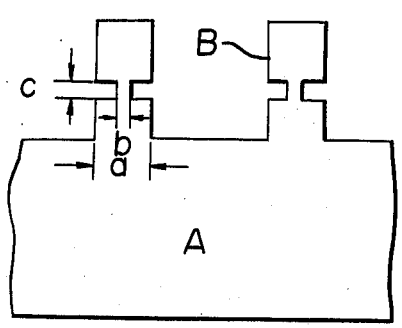
Figure 9:
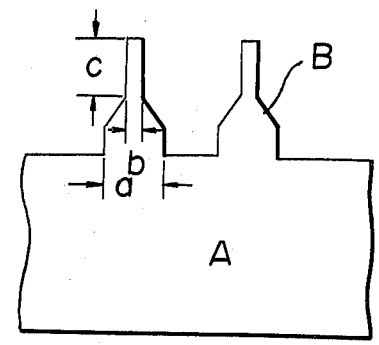
Figure 10:
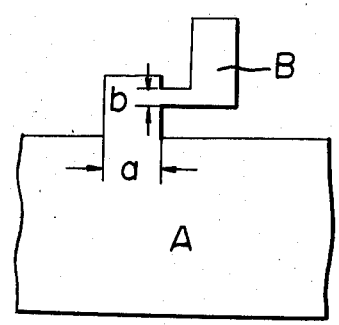

Referring to the drawings, the irrigation pipe of the present invention will be illustrated.

The irrigation pipes of the present invention can be prepared by a process shown in FIG. 1 (schematic view of the process) A base film C is coated with a peeling coat having a pattern of strip patterns A in the longitudinal direction or along the longitudinal axis thereof and throat distribution passage patterns B which are respectively branched from each of the strip patterns A between the strip patterns A,A. A molten film E made of a plastic resin extruded through a die D of an extruding machine is laminated on the base film C. It is possible to laminate a thermoplastic film by any other method instead of the extrusion lamination though such process is not shown.

After such lamination, the laminated film is slit by a slitter F in longitudinal direction between the adjacent strip patterns whereby many products can be effectively obtained by one line.

Suitable thermoplastic resins include polyethylene, ethylene copolymer, polypropylene, polyvinyl chloride, polyester, polystyrene, polyamide and polyurethane. It is especially preferable to use semi-hard or soft type resins such as ethylene-vinyl acetate copolymer, low density polyethylene and plastisized polyvinyl chloride because of high flexibility.

The word "film" in the specification includes not only a film having a thickness of less than 0.2 mm but also a sheet having a thickness of more than 0.2 mm though a film is sometimes so-called for one having a thickness of less than 0.2 mm.

It is possible to use a composite film made of different resins or a reinforced film reinforced with fiber can be used as well as a film made of one resin.

The kind of the thermoplastic resin for the base film can be a different plastic resin for the laminating film.

A peeling coat having the strip patterns A and distribution passage patterns B is formed on the base film C.

The peeling coat should not be substantially adhesive to the base film or the laminating film and should be easily peelable at the interface of the films.

The peeling coat is formed for the following purposes;

(1) to prevent an adhesion by the lamination; and (2) to be easily peelable at the interface between the peeling coat and the base film or the laminating film.

When a peeling coat having the strip patterns A and distribution passage patterns B is formed, the laminated surfaces at the peeling coats are not adhered and the laminated films are bonded at the other parts.

When the laminated films are used as an irrigation pipe, the end of the laminated films at the peeling coat having the strip pattern A can be easily separated to form an opening and the laminated film at the peeling coat having the strip pattern A can be easily peeled in longitudinal direction by supplying water under relatively low pressure to expand in a pipe form and a conduit is formed. The width of the strip pattern A is given as a lay flat width of a conduit. For example, when a diameter of the conduit is 19 mm, the width of the strip pattern A is about 30 mm.

When the conduit is formed, water is fed into the conduit and further into the distribution passage pattern B branched from the strip pattern A and the laminated film at the peeling coat are peeled in the passage pattern B whereby a water distribution passage is formed.

The passage pattern B is quite important. It is important to provide a throat part in the distribution pattern B in order to immerse water into the distribution passage from the conduit and to discharge water under relatively low water pressure (low initial discharging pressure) and to increase gradually a stable flow rate of water. This is an important feature of the present invention. The throat part is a narrow part in the distribution passage pattern B and the width of the throat parts should be narrower than that of the width at the joint from the strip pattern A to the distribution passage pattern B.

FIGS. 2 to 12 show certain embodiments of the distribution passage pattern B having the throat part. The patterns are not critical.

On the other hand, FIGS. 13 to 15 and FIGS. 24 to 26 show certain embodiments of the distribution passage pattern B having no throat part. In these Figures, the reference numeral (a) designates a width at a joint from the strip pattern A to the distribution passage pattern B; (b) designates a width at the throat part; (c) designates a length of the throat part; and b/a designates a reduction ratio. For example, the pattern has a=3 to 20 mm, b/a=0.7 to 0.1; especially a=5 to 15 mm and b/a=0.5 to 0.2.

These widths are selected depending upon a required initial discharging pressure; a required flow rate; a required pressure resistance; a prevention of clogging with particles in water, a kind of the thermoplastic resin and a thickness of the film.

The length (c) of the throat part can be c=0 as FIGS. 2 to 7 (step shape) or the throat part has suitable length (c) as FIGS. 8 to 12.

Figure 11:
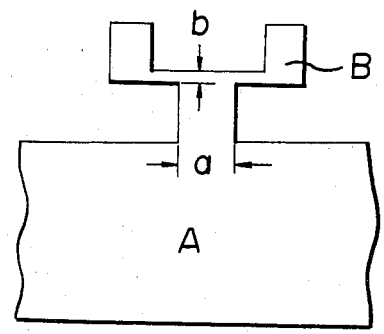
Figure 12:
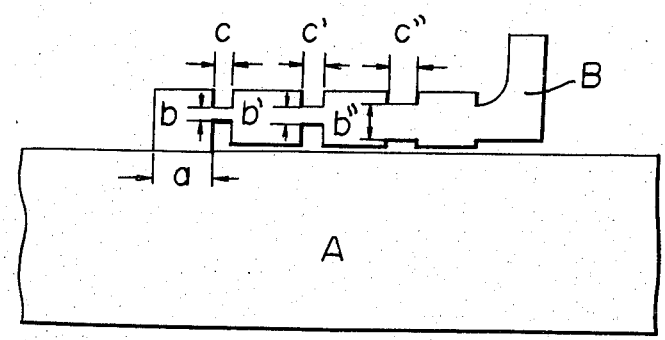

A plurality of the throat parts can be formed in a middle way as FIG. 12 and a plurality of the throat parts can be formed per one joint as FIG. 11. The throat part is usually formed near the joint from the strip pattern A to the distribution passage pattern B.

Figure 13:
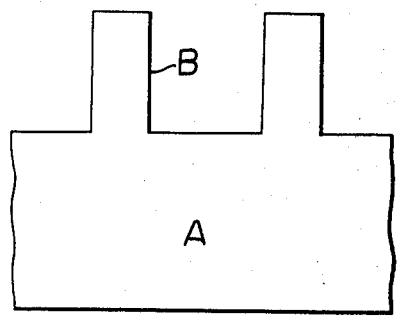
FIGS. 13 to 15 are plane views of embodiments of distribution passage patterns having no throat part.
Figure 14:
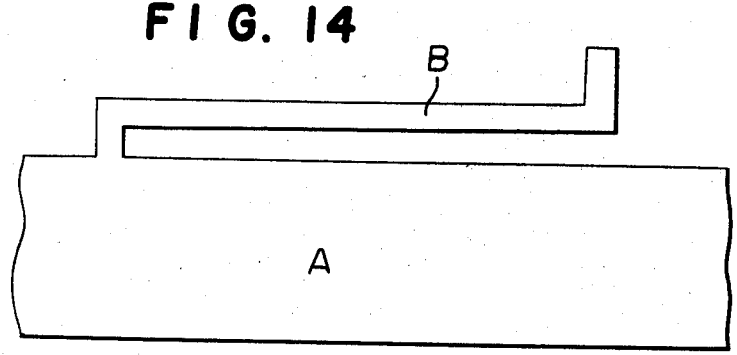
Figure 15:
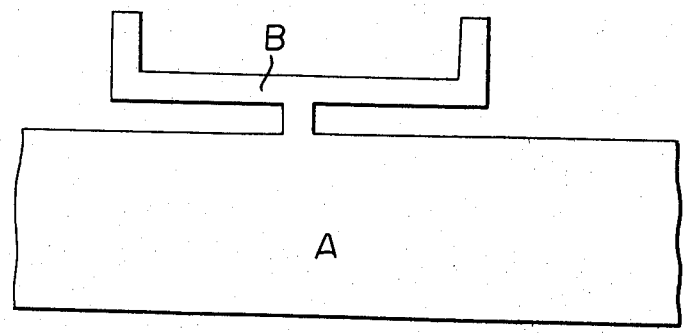

FIG. 16 is a graph showing the relation of the flow rates and the water pressures under applying a water pressure to the sample having the distribution passage pattern having a throat part (FIG. 2) and one having no throat part (FIG. 13).

In the case of no throat part, the curve -X- is given whereby it is necessary to apply higher water pressure for immersing water into the distribution passage pattern B and initiating a discharge of water by forming the water passage and a flow rate is suddenly increased and the control of the flow rate is not easy. Therefore, it is not suitable as an irrigation pipe.

On the contrary, when a throat part is formed, the curve -o- is given, whereby the water passage is smoothly formed under relatively low water pressure, and a flow rate is gradually increased to give stable flow rate.

When a throat part is not formed, the joint from the strip pattern A to the distribution pattern B is closed as a valve under a low water pressure and it is suddenly opened under applying high water pressure to increase suddenly the flow rate. On the other hand, when a throat part is formed, the part from the joint to the throat part is opened under a relatively low pressure and the condition is maintained to open the joint as the valve.

The shape of the distribution passage beside the throat part, can be straight, but it is preferable to provide a suitable pattern for satisfying practical requirements such as (1), to control finely the flow rate; (2), to form water drops or a fountain in a water discharging condition by reducing effectively the water pressure in the conduit and (3) to prevent a clogging with particles in water.

Figure 17:
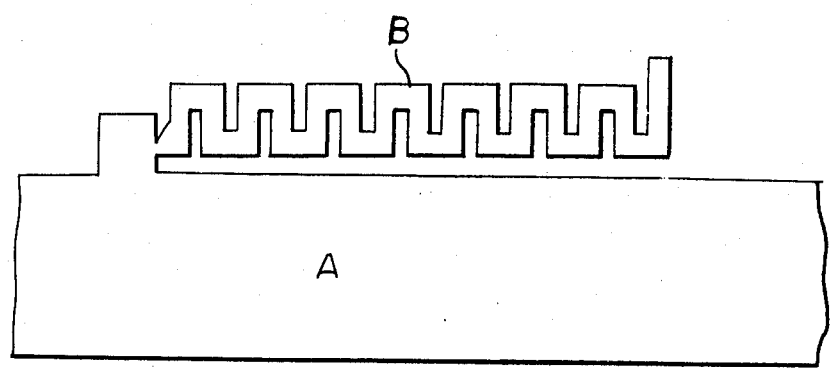
FIGS. 17 to 19 are plane views of embodiments of distribution passage patterns having a throat, a bent part, a curved part, and a branched part.
Figure 18:
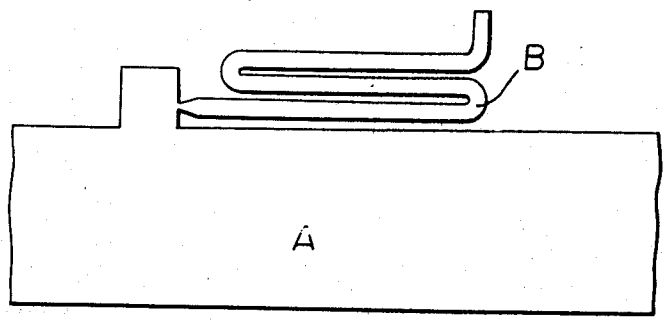
Figure 19:
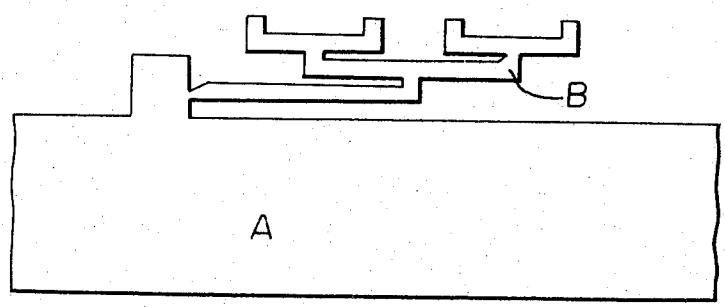

FIGS. 17 to 19 shows certain embodiments for said purposes. These are not critical.

FIG. 17 shows an embodiment having a bent part and FIG. 18 shows an embodiment having a curved part and FIG. 19 shows an embodiment having a branched part.

In the forms of these embodiments having a bent part, a curved part or a branched part, the flow rate can be easily controlled and the water pressure reducing effect is high even though a width of the passage is relatively large so as to prevent a clogging. Moreover, an area for the distribution passage pattern can be compact and the material can be saved.

The distribution passage pattern B can be formed between both sides of the strip pattern A or it can be formed only in one side.

Suitable methods of coating a peeling coat having the strip pattern A and the distribution passage pattern B on a surface of the plastic resin film include a gravure printing method, a flexographic printing method or a silk-screen printing method using a vaporize-drying type printing ink comprising a solvent and a macromolecular solid binder having weak adhesiveness to a thermoplastic resin film. The printing ink can be selected depending upon kinds of thermoplastic resin used for the film. For example, it is preferable to use a varporize-drying type printing ink comprising a solid binder such as rosin esters, cellulose derivatives, vinyl chloride-vinyl acetate copolymers and polyamides in a printing on a film made of a polyolefin such as polyethylene, ethylene copolymers, and polypropylene, because the adhesiveness of the binder is low. A desired peeling coat can be easily formed on the surface of the film. It is also possible to coat a resin having peeling property such as silicone resin on the surface of the film in the strip pattern A and the distribution passage pattern B.

The lamination can be the extrusion lamination shown in FIG. 1 and also a dry lamination, a hot melt lamination and a thermal lamination. These methods can be used for the lamination in the present invention.

The optimum lamination imparting high bonding strength can be selected depending upon the thermoplastic resin. For example, an extrusion lamination or a dry lamination is preferably selected when a film made of a polyolefin such as polyethylene, ethylene copolymers and polypropylene is used because of high bonding strength.

After the lamination as shown in FIG. 1, the laminated films can be continuously slitted by a slitter equipped with the laminator. It is also possible to slit the laminated film by a separate slitter after winding up the laminated films.

Figure 20:
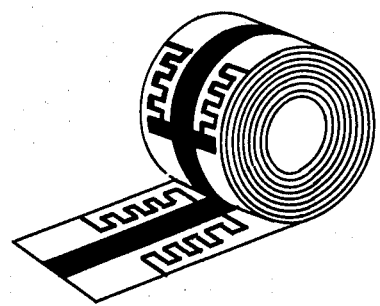
FIG. 20 shows a condition of wound irrigation pipe of the present invention.
Figure 21:
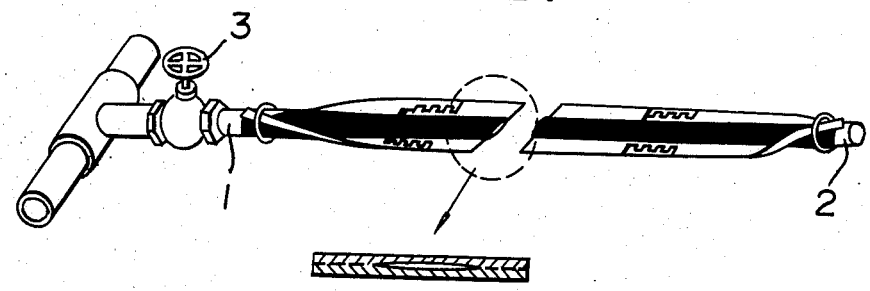
FIG. 21 shows a schematic view of the irrigation pipe of the present invention which is laid down and connected to a water source.
Figure 22:
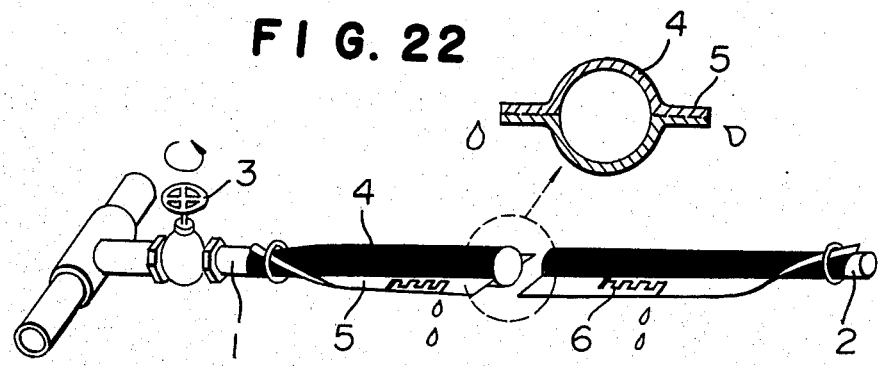
FIG. 22 shows a schematic view of the irrigation pipe of the present invention which is used by supplying water through a water source.

The irrigation pipe of the present invention prepared by said process can be wound in a compact form as shown in FIG. 20. When it is used, it is laid down on or under the surface of the culture field as shown in FIG. 21. One end of the laminated film at a peeling coat having the strip pattern A is peeled to form an opening and the opening is connected to an outlet (1) of a water supply from a water source and the other end of the laminated film is also peeled to form an opening and a plug (2) is inserted to close the opening. The irrigation pipe of the present invention is flat before supplying water. Then, a valve (3) is opened to supply water from the water supply, the part having the strip pattern A is easily peeled to expand in a pipe form as shown in FIG. 22, and to form a conduit (4). Moreover, water is immersed into the part having the distribution passage pattern B branched from the strip pattern A and the laminated films having the distribution passage pattern B is easily peeled to form water distribution passage (6) in the laminated part (5) projected as fin in both sides of the conduit. The water pressure in the conduit is reduced and water is discharged at a controlled flow rate from the water distribution passage (6). The flow rate is controlled depending upon the water pressure in the conduit (4) and width, length and shape of the distribution passage pattern B.

Figure 23:
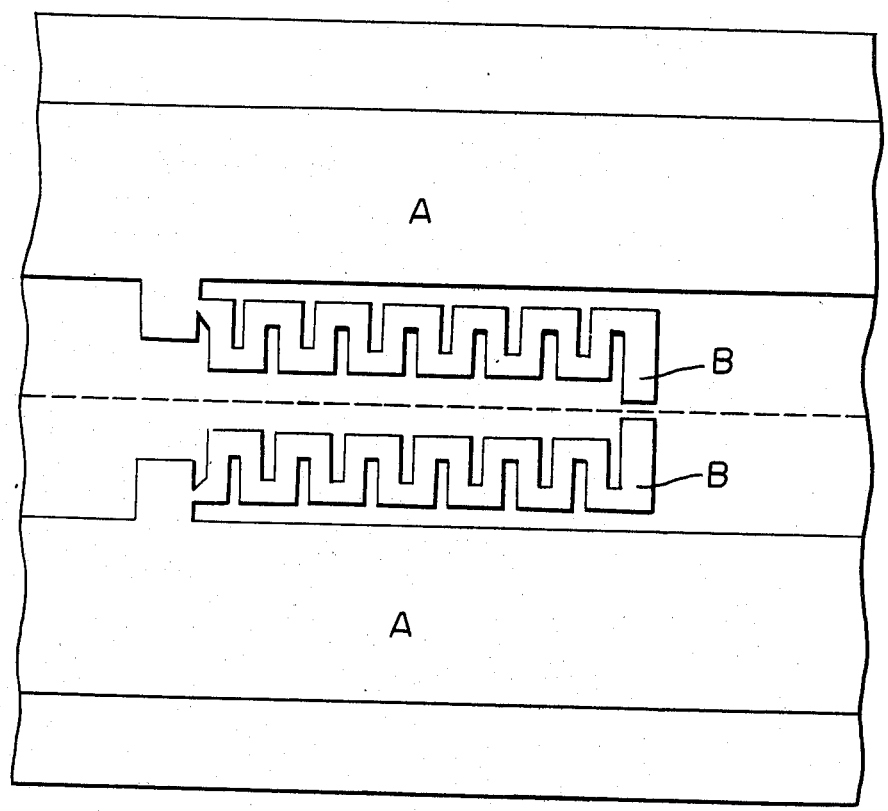
FIG. 23 is a plane view of an embodiment of a distribution passage wherein an outlet in not cut.
Figure 24:
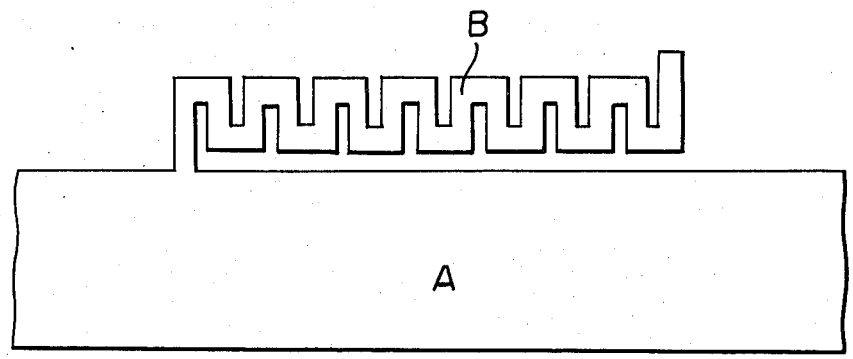
FIGS. 24 to 26 are plane views of embodiments of distribution passage patterns having a throat part.
Figure 25:
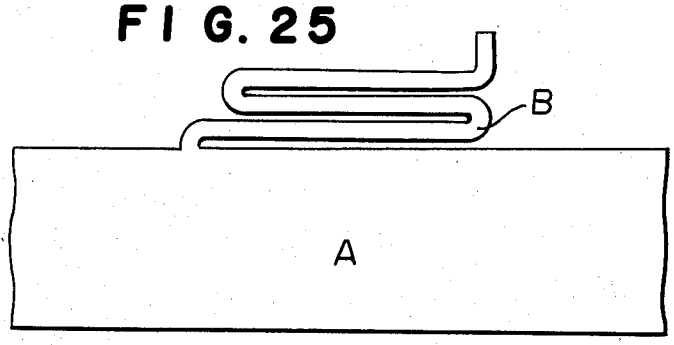
Figure 26:
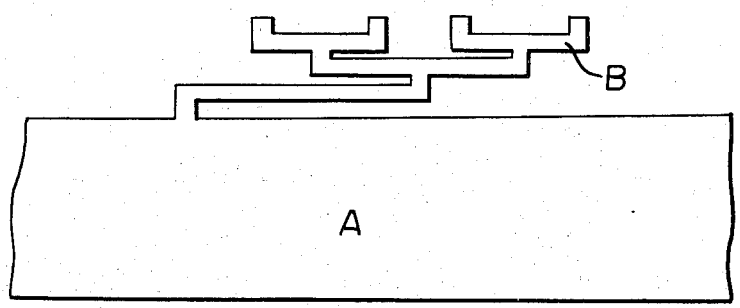

The space between water distribution passages (6) formed at both sides of the conduit is selected depending upon kinds of plants and purposes of the water distribution. When a large space for water distribution is required such as in orchard, it is preferable to employ the embodiment of FIG. 23 wherein an outlet of the distribution passage pattern B is not cut, but a slit is formed as shown by the dotted line. After laying down the irrigation pipe, only the outlets of the distribution passage pattern B near the fruit tree are cut. In this case, water can be effectively supplied only near the fruit tree requiring water supply, conveniently. Such application could not be considered by the conventional irrigation equipments. This is the unique feature of the irrigation pipe of the present invention.

As described above, the irrigation pipe of the present invention comprises a conduit part formed by peeling, at a center in longitudinal direction, laminated films made of the same or different thermoplastic resin and laminated side parts projected to both sides in longitudinal direction, laminated films made of the same or different thermoplastic resin and laminated side parts projected to both sides of the conduit in a form of fins and a water distribution passage formed by peeling at least one of the laminated side parts in a distribution passage pattern having a throat part which is branched from the conduit.

The following advantages can be expected.

(1) The distribution passage pattern has a throat part whereby the water distribution passage can be easily formed even though water pressure is relatively low and water discharge can be easily started and a flow rate is gradually increased depending upon an increase of water pressure to give stable flow rate. The flow rate can be finely controlled and the flow rate at the end is not substantially reduced to give uniform irrigation even though a long pipe is used, depending upon a selection of a reduction ratio and a length of the throat part, if necessary a combination of a bent part, a curved part or a branched part. The water pressure in the conduit is effectively reduced whereby water can be discharged in a form of water drops or fountain and a clogging with particles in water can be prevented.

(2) Many products can be prepared at high speed in parallel in one line. The productivity is significantly higher than those of the conventional irrigation equipments. A large size molding machine can be used to reduce a cost for processing by a mass production though it has been difficult to employ such machine in the conventional process.

(3) When the irrigation pipe is not used, it can be wound compactly since it can be flat. Therefore, the irrigation pipe can be easily laid down and taken up and conveniently moved and stored and the handling of the irrigation pipe is remarkably easier than those of the conventional irrigation equipment.

(4) This a method of coating a peeling coat having a distribution passage pattern, and accordingly, a complicated pattern of the water distribution passage can be easily formed in comparison with the conventional processes. The pattern of the water distribution passage can be easily varied depending upon requirement in applications.

(5) This is a lamination method of laminating after coating a peeling coat having a distribution passage pattern on a substrate, and accordingly, the water distribution passage can be accomplished with high accuracy in comparison with those of the conventional processes. Therefore precise products having less variation of the flow rate can be obtained. The size of the throat part as the important feature of the present invention affects initial discharge pressure and flow rate and accordingly, it is important to form the throat part with high accuracy. This can be easily attained.

What is claimed is:

1. A water dropping type irrigation pipe which comprises a base film;
   a peeling coating mounted on said base film along the longitudinal axis of said base film;
   a second film laminated onto said base film and said peeling coating to form a water conduit having at least one opening; and
   a plurality of laminated side parts projected from at least one side of the conduit in the form of fins to form a distribution passage which is branched from the conduit and has a throat in fluid communication with each of said at least one openings wherein said water distribution passage is formed by said conduit and said throat part and wherein said throat part is smaller in width than the distribution passage and said at least one opening.

2. An irrigation pipe according to claim 1 wherein said second film comprises a thermoplastic resin.

3. An irrigation pipe according to claim 2 wherein said thermoplastic resin is selected from the group comprising polyethylene, ethylene copolymer, polypropylene, polyvinyl chloride, polyester, polystyrene, polyamide, polyurethane, ethylene-vinyl acetate copolymer, low density polyethylene and plastisized polyvinyl chloride.

4. An irrigation pipe according to claim 2 wherein said base film and said second film comprise flat-shaped film.

5. An irrigation pipe according to claim 1, wherein said base film and said second film comprise flat-shaped film.

6. An irrigation pipe according to claims 1 or 2 or 3 or 5 wherein said peeling coating and said laminated side parts comprise dried printing ink.

7. An irrigation pipe according to claims 1 or 2 or 3 or 4 or 5 wherein said peeling coating and said laminated side parts comprise a silicone resin.

* * * * *